Patented Feb. 26, 1924.

1,484,863

UNITED STATES PATENT OFFICE.

FRED BECKER, OF CLEVELAND, OHIO.

MACARONI AND METHOD OF PREPARING THE SAME.

No Drawing.    Application filed April 21, 1920.   Serial No. 375,620.

*To all whom it may concern:*

Be it known that I, FRED BECKER, a citizen of the United States, residing at Cleveland, in the county of Cuyahoga and State of Ohio, have invented certain new and useful Improvements in Macaroni and Methods of Preparing the Same, of which the following is a specification.

My invention pertains to macaroni and like paste products and to a method for preparing such paste products, and my object is to provide a paste product which will possess all the qualities and properties required to make a commodity easily handled and lasting in trade and palatable and properly flavored and prepared when sold to the consumer, and one which may be quickly cooked and ready to serve without the addition of garnishes and flavors while being cooked.

Heretofore, the macaroni on the market contained no other ingredients but flour, water and possibly salt, and the garnish or flavor given to the macaroni was entirely dependent upon the individual skill of the cook. This flavor was not incorporated in the macaroni itself, but usually given by the addition of other ingredients to the macaroni while it was cooking. In my product the flavor is incorporated uniformly within the dough itself, no skill is required to cook any given quantity for the table, and it takes only a few minutes to cook and bring it to the proper state for consumption. Additional ingredients can be added when cooking to suit individual tastes, but the article as prepared by my method is sufficient in itself to meet the taste of the average individual.

In making my so-called prepared macaroni I use a preponderating amount of durum wheat called "Semolina." Durum wheat is a Russian wheat and is harder and contains more gluten than spring wheat or other wheat and it is usually ground coarse and yellow in color.

The next important ingredient consists of eggs, and milk, both powdered, and preferably more eggs than milk. The next important ingredient is Parmesan cheese which has a fine flavor, and is evaporated and ground. Extract of beef is also preferably incorporated in the form of a dry powder, and to the ingredients mentioned I also add spices of various kinds, preferably table salt, celery salt, garlic salt, onion salt, red pepper and paprica.

In compounding the different powdered ingredients or flour together, I mix water with the flour in a suitable flour mixer until a batch of small separated pieces of dough is produced. The amount of water is less than that required to make one thick large batch, and the dough is not made wet enough to produce a sticky mass or batch. Then these separate pieces of wet dough are subjected to a temperature of approximately 140° F. for about eight hours or until they are thoroughly dried, hard but in a fluffy condition. Heating as described makes the dough fluffy, preserves the ultimate flavor, and kills all the germs.

The next step taken consists in gathering the treated material together and grinding and placing it again into the mixer, then adding water until the dough is wetter than in the first step and instance. This is done to make the dough pliable enough for working and passing it through a macaroni press where it is formed into tubes which are cut off into any given lengths, preferably short lengths. The cut macaroni is then dried a second time for about 14 to 16 hours, either in a drying room or in revolving cylinders according to common practices. When thoroughly dried, the product is hard and brittle, lasting, easily handled, and ready for consumption without the addition of garnishes or flavors when cooked.

To retain the flavor in the completed product it appears essential to dry the moist mixture to a fluffy condition, then regrind it, and then add water to obtain a dough of the right consistency so that it may be worked through a macaroni press before drying it a second time. If the original mixture of dough is introduced into the press without first drying and forming the dough into a fluffy condition, the pressed product lacks the desired taste and flavor, and it cannot be cooked satisfactorily in the short interval of time which the more finished product takes as hereinbefore stated.

An exceptionally palatable and desirable compound can be made according to the steps herein described by using the following proportions of ingredients: to wit,

| | |
|---|---|
| Powdered eggs | 6 lbs. |
| Parmesan cheese, evaporated and ground | 2 lbs. |
| Powdered milk | 2 lbs. |
| Red pepper, onion salt, celery salt, garlic salt, common table salt | 1 lb. |
| Durum wheat flour | 135 lbs. |

Extract of beef, and powdered tomatoes may also be added in small amounts, if desired, and the preliminary mix with the amount of materials given may be undertaken with approximately 2½ gallons of water.

What I claim is:

1. A method of preparing macaroni and like paste products, consisting in mixing a preponderating amount of wheat flour and relatively small amounts of flavoring materials and a liquid together to produce a dough; drying said dough; grinding the dry material; forming a wet paste from the ground material; passing the paste through a macaroni press; and drying the pressed material until it is hard and brittle.

2. A method of preparing macaroni and like paste products, consisting in mixing a preponderating amount of wheat flour and a relatively small percentage of powdered eggs, powdered milk, cheese and spices together; adding water and working the mixture into a batch of separated pieces of moist dough; subjecting said pieces of dough to heat until dried and in a fluffy condition; grinding the fluffy material and adding water until pliable; passing the pliable material through a macaroni press; cutting the pressed material into given lengths; and drying the cut material until hard and brittle.

3. A method of preparing macaroni and like paste products, consisting in mixing a large amount of wheat flour and lesser amounts of eggs, milk, cheese and spices together with a scant amount of water; subjecting the mixed material to a heating temperature of approximately 140° F. for about eight hours; reducing and forming a paste of the treated material passing the paste through a forming press; and slowly drying the pressed product until hard and brittle.

4. The product of the method herein described, consisting of a permanently flavored hard brittle macaroni comprising a preponderating amount of wheat flour, a relatively small percentage of powdered eggs, and lesser amounts of powdered milk and cheese and spices and flavoring materials.

5. The product of the method herein described, comprising a hard and brittle macaroni containing approximately four per cent of eggs, one to two per cent of cheese, one to two per cent of milk, less than one per cent of spicing materials, and the balance wheat flour.

Signed at Cleveland, in the county of Cuyahoga, and State of Ohio, this 14th day of April, 1920.

FRED BECKER.